Aug. 17, 1965     T. G. BUDD ETAL     3,200,908
FLUID MOTOR, BACKING PLATE CONNECTION
Filed June 5, 1963                                               2 Sheets-Sheet 2
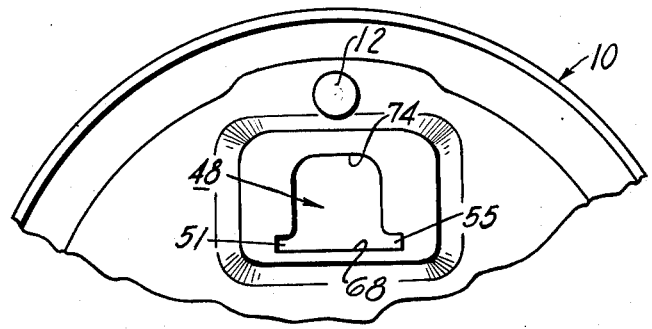
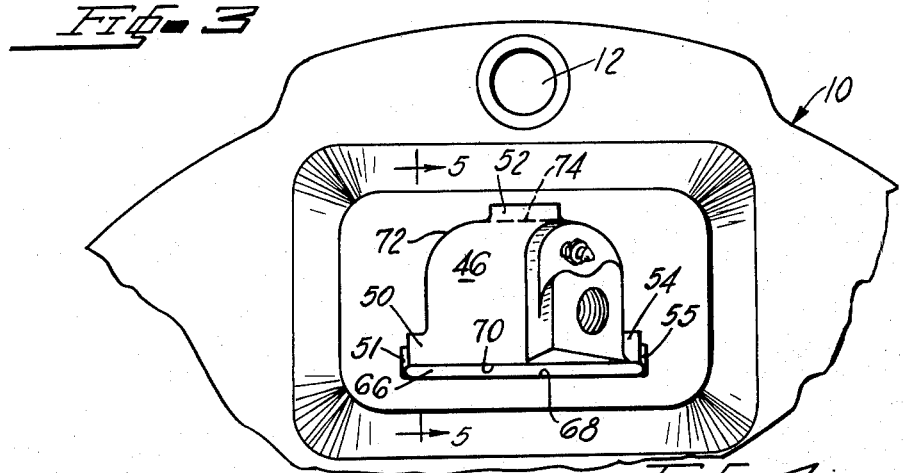
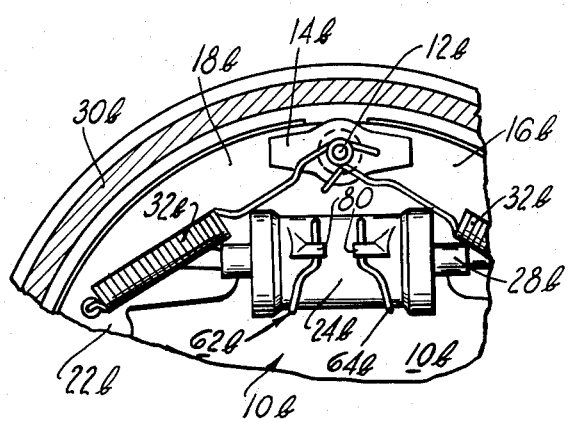
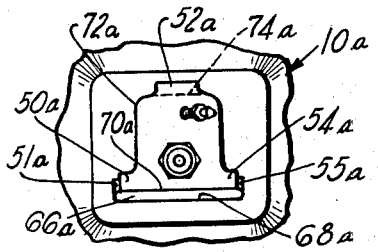
TRAVIS G. BUDD
JOHN L. TURAK
DONALD D. JOHANNESEN
ROY E. McCANDLISH
            INVENTORS
BY
*Sheldon F. Raizes*
     ATTORNEY United States Patent Office 3,200,908
Patented Aug. 17, 1965

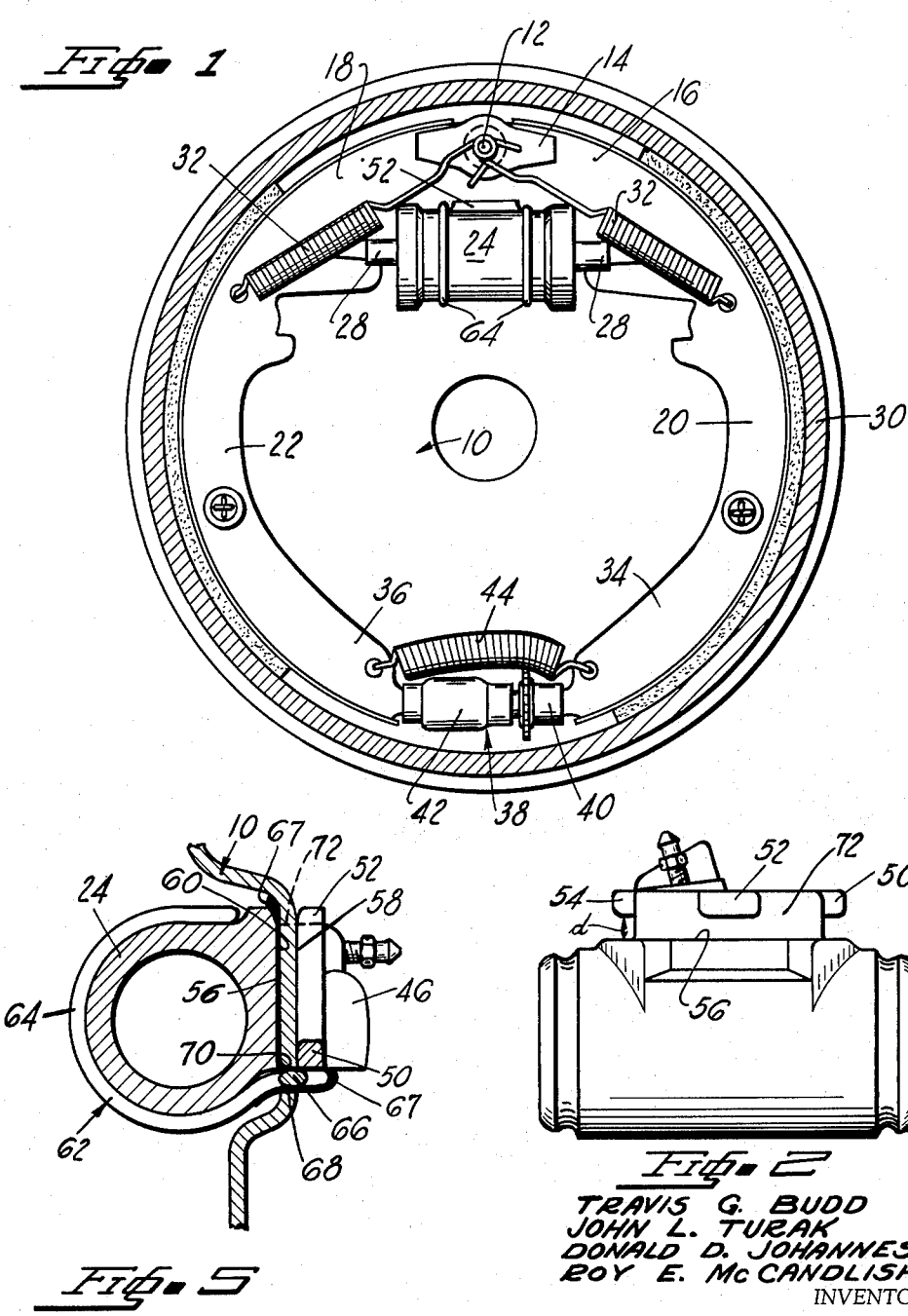

3,200,908
FLUID MOTOR, BACKING PLATE
CONNECTION
Travis G. Budd, John L. Turak, Donald D. Johannesen, and Roy E. McCandlish, South Bend, Ind., assignors to The Bendix Corporation, South Bend, Ind., a corporation of Delaware
Filed June 5, 1963, Ser. No. 285,662
16 Claims. (Cl. 188—78)

This invention concerns a fluid motor, backing plate connection.

An object of this invention is to provide a drum brake with a fluid motor, backing plate connection which is an improvement over the wheel cylinder backing plate connection embodiments illustrated in U.S. application Serial No. 150,929 filed November 8, 1961 (common assignee).

A further object of the invention is to provide a fluid motor, backing plate connection wherein the fluid motor has a boss extending into an opening of the backing plate and a locking member is interposed between a portion of the backing plate and the fluid motor for securing the fluid motor to and maintaining the same in position on the backing plate.

Further objects of the invention will become apparent from the following description with reference to the drawings wherein:

FIG. 1 is a front elevational view of the brake assembly;

FIG. 2 is a top view of the fluid motor of FIG. 1;

FIG. 3 is a partial rear view of the backing plate illustrating the opening for the fluid motor;

FIG. 4 is a rear view of a fluid motor and backing plate assembly of FIG. 1;

FIG. 5 is a view taken along section line 5—5 of FIG. 4;

FIG. 6 is a partial rear view of a modification of a fluid motor and backing plate assembly; and FIG. 7 is a partial view illustrating a modification of FIG. 1.

With reference to FIG. 1, the brake with which the device of the invention is associated comprises a backing plate 10 mounted on an appropriate part of a vehicle such, for example, as the axle flange, not shown. Positioned on the backing plate is a fixed anchor pin 12 provided with a guide member 14 extending parallel to the backing plate for sliding engagement with ends 16 and 18 of shoes 20 and 22 so as to retain the adjacent shoe ends in a laterally fixed location with respect to backing plate 10. The shoe ends 16 and 18 are spread apart by a fluid motor or wheel cylinder 24 secured to the backing plate 10 by means which are to be described in detail hereinafter. The fluid motor includes a pair of oppositely acting pistons, not shown, operatively connected to shoe ends 16 and 18 through the force transmitting links 28. Actuation of the pistons applies a force to each of the links tending to move the shoes toward a rotatable drum 30 which may be secured to a wheel, not shown. Springs 32 each have one end connected to the anchor 12 and the other end connected to a respective one of the shoes to urge them into contact with the anchor when the fluid motor is not pressurized. The shoe ends 34, 36, oppositely disposed from the anchor 12 are interconnected by an adjusting mechanism 38. The adjusting mechanism comprises an adjusting screw 40 rotatably connected to the shoe end 34 and an adjusting screw nut 42 which is fixedly secured to the shoe end 36. Spring 44 acts to maintain the shoe ends 34 and 36 in engagement with the adjusting mechanism 38.

Referring to FIGS. 2–5, the fluid motor or wheel cylinder 24 has a generally D shaped boss 46 extending through a generally hat shaped opening 48 in the backing plate 10. Three lugs 50, 52 and 54 extend from the periphery of the boss 46 and are spaced rearwardly a distance $d$ from a flat surface 56 on the main body portion of the fluid motor 24. The distance $d$ is substantially the same as the thickness of the backing plate 10. The hat shaped opening 48 is the shape of the combined configuration of the D shaped boss and the lugs 50 and 54 extending therefrom with the portion of the opening corresponding to the boss being oversized to permit upwards movement of the boss relative to the backing plate. Portions 51 and 55 of the opening correspond to the shape of the lugs 50 and 54 for receiving the same therethrough. The lugs 50, 52, and 54 engage the rear surface 58 of the backing plate 10 to prevent the wheel cylinder from moving axially forwards and the flat surface 56 bears on the front surface 60 of the backing plate to prevent the wheel cylinder from moving axially rearwards. A locking member, which is an integral wire clip 62, has a pair of spaced resilient C shaped arms 64 grasping the main housing of the wheel cylinder 24 and a portion 66, which interconnects the two arms 64, extending through the opening 48 between the edge 68 of the opening 48 and the bottom edge 70 of the boss 46. The connecting portion 66 of the wire clip 62 prevents the wheel cylinder 24 from moving downwards and thus secures or maintains the wheel cylinder in position on the backing plate 10. In this embodiment, the portion 66 is not force fitted between the edges 68 and 70, and thus the connection of the arms 64 to the wheel cylinder 24 serves to retain the wire member 62 in its position. A sealing gasket 67 prevents contaminates from entering the brake assembly through the opening 48.

In order to connect the wheel cylinder to the backing plate 10 the boss 46 is inserted from the front of the backing plate through the opening 48 and then moved upwards until the peripheral edge 72 of the boss engages the curved edge 74 of the opening 48. The lugs 50, 52 and 54 will then be behind the backing plate surface 58 to prevent forward axial movement of the wheel cylinder 24. The connecting portion 66 of the wire clip 62 is inserted between the straight edge 70 of the boss 46 and the straight edge 68 of the opening 48 to secure and maintain the wheel cylinder in position on the backing plate 10. The arms 64 are then clipped or snapped on to the wheel cylinder 24 to maintain the wire clip 62 in its position. The reverse procedure would be applied to remove the wheel cylinder from the backing plate.

Referring to FIG. 6, there is illustrated a partial rear view of a wheel cylinder, backing plate assembly wherein the boss extending through the opening in the backing plate is rectangular shaped. The opening in the backing plate is T-shaped to receive the boss and lugs. The elements which are similar to those of FIGS. 1–5 are designated by the same reference numerals with an $a$ affixed thereto.

It should be noted that the wheel cylinders may be placed in the backing plate opening without tilting or any special maneuvering of the wheel cylinder to get the entire boss through the opening.

Referring to FIG. 7, the parts which are similar to those illustrated in FIGS. 1–5 are given the same reference numerals with a $b$ affixed thereto. The connection of the clip 62 to the wheel cylinder 24 is modified in this embodiment. The wire clip 62$b$ has a pair of spaced resilient arms 64$b$ which are biased into engagement with a respective one of a pair of ears 80 integral with the main body of the wheel cylinder 24$b$.

It should be recognized that a member could be wedged between the edge 68 of the opening 48 and the edge 70 of the boss 46 eliminating the need for securing the member to the wheel cylinder to maintain the member in locking position.

Although this invention has been illustrated and described in connection with specific embodiments, numerous other adaptations will be apparent to those skilled in the art. I intend to include within the scope of the following claims all equivalent applications of the invention whereby the same or substantially the same results may be obtained.

We claim:

1. In a brake assembly, a backing plate having an opening therein, a fluid motor housing located on the front of said backing plate and having a boss extending from the rear thereof through said opening, at least one lug extending from a peripheral portion of said boss and located opposite a portion of the rear face of said backing plate surrounding said opening, at least a portion of the edge of said opening being spaced from a corresponding peripheral portion of said boss, a locking member located in said space to secure and maintain said fluid motor in position on said backing plate, and means operatively securing said locking member to said fluid motor housing for retaining said locking member in position.

2. The structure as recited in claim 1 wherein said locking member is wire.

3. The structure as recited in claim 1 wherein said locking member is a one piece wire having a pair of spaced resilient arms interconnected by a portion transverse thereto, said transverse portion extends into said space, and said arms are operatively connected to said fluid motor housing.

4. The structure as recited in claim 3 wherein said arms clasp said fluid motor housing to provide said connection therebetween.

5. The structure as recited in claim 3 wherein the connection between said arms and said fluid motor housing comprises a pair of ears on said fluid motor housing and each said arms being biased against a respective one of said pair of ears.

6. In a brake assembly, a backing plate, a fluid motor housing located on the front of said backing plate and having a boss extending from the rear thereof, a pair of spaced lugs extending from peripheral portions of said boss, an opening in said backing plate being generally of the shape of the combined configuration of said boss and said lugs, said boss extending through said opening with the lugs being disposed opposite the rear face of said backing plate at the junction of the lug shaped portion of said opening with the boss shaped portion of said opening, a space between a portion of the edge of said opening and a corresponding peripheral portion of said boss, and means located within said space for securing and maintaining said fluid motor in position on said backing plate.

7. The structure as recited in claim 6 wherein said means comprises a locking member located in said space.

8. The structure as recited in claim 7 wherein said locking member is a one piece wire having a pair of spaced resilient arms interconnected by a portion transverse thereto, said transverse portion extends into said space, and said arms are operatively connected to said fluid motor housing.

9. The structure as recited in claim 8 wherein said arms clasp said fluid motor housing to provide said connection therebetween.

10. The structure as recited in claim 8 wherein the connection between said arms and said fluid motor housing comprises a pair of ears on said fluid motor housing and each said arms being biased against a respective one of said pair of ears.

11. In a brake, a backing plate, a fluid motor housing located on the front of said backing plate and having a generally D shaped boss extending rearwardly therefrom, a pair of spaced lugs extending from peripheral portions of said boss, one of the edges of each of said lugs being an extension of the straight edge of said boss and another edge of each of said lugs being integral with the edge of said boss intersecting said straight edge, a generally hat shaped opening in said backing plate, said boss extending through said opening with the lugs being disposed opposite a portion of the rear face of said backing plate which surrounds said opening, a space between the straight edge of said boss and the corresponding edge of said opening, and means located within said space for securing and maintaining said fluid motor in position on said backing plate.

12. The structure as recited in claim 11 wherein said means comprises a locking member located in said space.

13. The structure as recited in claim 12 wherein said locking member is a one piece wire having a pair of resilient generally C shaped arms clasping said fluid motor housing and a portion interconnecting said arms and transverse thereto extending into said space.

14. In a brake, a backing plate, a fluid motor housing located on the front of said backing plate and having a generally rectangular shaped boss extending rearwardly therefrom, a pair of spaced lugs extending from peripheral portions of said boss, one of the edges of each of said lugs being an extension of one of the straight edges of said boss and another edge of each of said lugs being integral with the edge of said boss intersecting said one straight edge, a generally T-shaped opening in said backing plate, said boss extending through said opening with the lugs being disposed opposite a portion of the rear face of said backing plate which surrounds said opening, a space between said one straight edge of said boss and the corresponding edge of said opening, and means located in said space for securing and maintaining said fluid motor in position on said backing plate.

15. The structure as recited in claim 14 wherein said means comprises a locking member located in said space.

16. The structure as recited in claim 15 wherein said locking member is a one piece wire having a pair of resilient generally C shaped arms clasping said fluid motor housing and a portion interconnecting said arms and transverse thereto extending into said space.

References Cited by the Examiner
UNITED STATES PATENTS

| | | | |
|---|---|---|---|
| 2,541,551 | 2/51 | Schnell | 188—152.82 |
| 2,785,776 | 3/57 | Maina | 188—152.81 |

ARTHUR L. LAPOINT, *Primary Examiner.*

RALPH D. BLAKESLEE, *Examiner.*